July 4, 1939.   H. L. SARGENT   2,164,353
THERMOSTATIC CONTROL SYSTEM
Filed Dec. 14, 1935

INVENTOR
Herbert L. Sargent
BY
Parker, Carlson, Pitzner & Hubbard
ATTORNEYS

Patented July 4, 1939

2,164,353

UNITED STATES PATENT OFFICE 2,164,353

THERMOSTATIC CONTROL SYSTEM

Herbert L. Sargent, North Danville, N. H.

Application December 14, 1935, Serial No. 54,394

7 Claims. (Cl. 236—9)

This invention relates generally to the control of systems for heating the air of buildings and more particularly to a thermostatic control of the character in which the detrimental effect of various factors, such as lag of the heating system, are overcome through the use of an auxiliary control means associated with the thermostat and acting thereon to cause interruption in the increase of heat supply in advance of a rise in the room temperature to the desired value following a call for heat.

One object of the invention is to provide in a system of the above character a novel means for controlling the operation of the auxiliary control device.

The invention also resides in the provision of a control of the above character which is especially adaptable for use with room thermostats of the type having two switches which are closed in succession in response to a fall in the space temperature.

Figure 1:
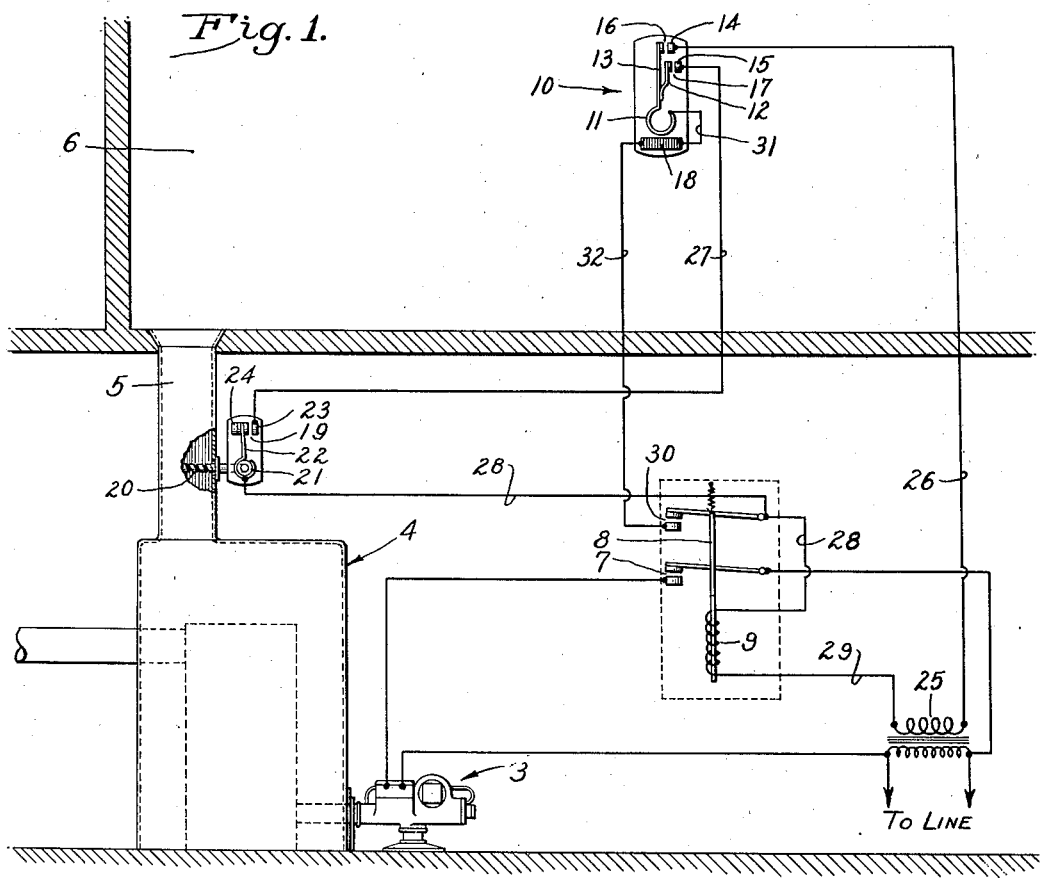

Other objects and advantages of the invention will become apparent from the following detailed description taken in connection with the accompanying drawing, in which Figure 1 is a schematic view and wiring diagram illustrating the application of the present control to the heating system for a building.

Figure 2:
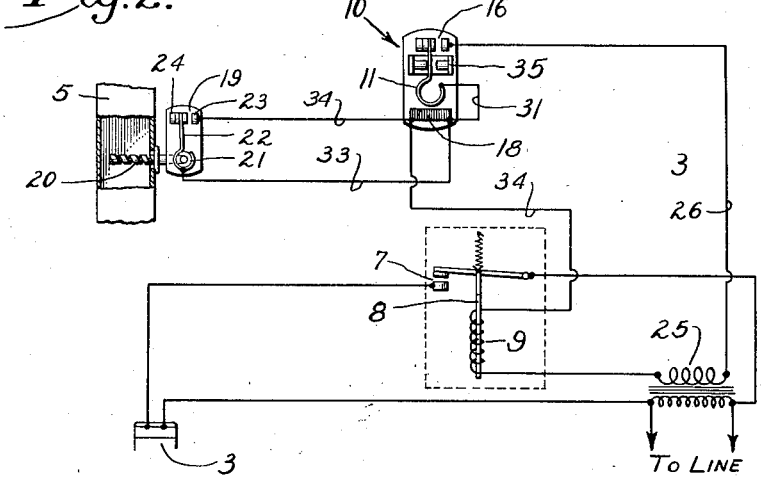

Fig. 2 is a schematic view and wiring diagram illustrating a modified form of the invention.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

For purposes of illustration, the invention is shown in the drawing in connection with a heating system of the warm air type in which heat from a primary source, such as a liquid fuel burner 3, is delivered to air within the jacket of a furnace 4 and conveyed through piping 5 to a space 6, the temperature of which is to be controlled. The burner 3 may be started and stopped by closure and opening of a switch 7 operated by an armature 8 which is moved to switch-closed or heat-increasing position when a winding 9 is energized and permitted to move to switch-open or heat-decreasing position when the winding is deenergized.

A controlling thermostat 10 is located at the proper point in the space 6 and operates to detect variations in the space temperature relative to a predetermined temperature which is to be maintained. In the form shown in Fig. 1, the thermostat is of the type having a thermostatic element 11, the free end of which carries a relatively stiff blade 12 and a relatively flexible blade 13, cooperating with stationary contacts 14 and 15 to form switches 16 and 17. When the space temperature is above that for which the thermostat is set, both of the switches are open. As the temperature falls, the flexible blade first engages the contact 14, and after a further fall in temperature, the switch 17 is closed.

An auxiliary control means is associated with the thermostat 10 for causing movement of the contact arm 13 thereof to heat-decreasing position irrespective of the prevailing room thermostat and after the lapse of an interval which is measured from the time when the thermostat calls for heat and which varies in length according to the lag of the heating system. While the auxiliary control means may be operated in various ways, for example, by magnetic action, it is preferred to employ an electric heater having a resistance element 18 positioned adjacent the thermostatic element 11 so as to heat the latter to a false temperature several degrees above that of the surrounding air. Preferably, the capacity of the heater 18 is such that both of the switches 16 and 17 will be opened after the heater has been energized for several minutes, for example, five.

A thermostatically actuated switch 19 is employed to control the effective operation of the auxiliary control means and is arranged to detect rises and falls in temperature at a point in the heating system between the primary source of heat and the room thermostat. In systems of the character shown, the switch 19 is operated by a thermostatic element 20 preferably located in one of the warm air ducts 5. The movable end of the thermostatic element 20 operates through the medium of a friction clutch or equivalent slip device 21 to move an arm 22 carrying the movable contact of the switch 19 between opposite limit positions determined by the position of the stationary contact 23 of the switch and a stop 24. The arrangement is such that the arm 22 will move from one limit position to the other upon a change of approximately five degrees in the temperature of the thermostatic element 20. Further, the element 22 is arranged to open the switch 19 upon a rise in temperature and to close the switch upon a fall in temperature through the operating range of the arm 22.

The burner 3 will be started to initiate an increase in the supply of heat to the space when the three thermostat switches 16, 17 and 19 are closed which will be the case when the room thermostat calls for heat following a fall in the temperature within the duct 5. This circuit extends from the power source 25 through a conductor 26, the switch 16, the blades 13 and 12, the switch 17, a conductor 27, the switch 19, a conductor 28, the winding 9, and a conductor 29. When the armature 8 moves to close the burner starting switch 7, a switch 30 is also closed which completes a holding circuit for the winding 9 independently of the switch 19. This circuit extends through the room thermostat switch 16, a conductor 31, the heater 18, a conductor 32, and the switch 30 to the conductor 28. While the circuit through the heater 18 is thus completed as an incident to starting of the burner, the heater will be maintained ineffective owing to the short circuit therearound which is maintained by the switch 19.

The initial delivery of heat to the space 6 will be evidenced by a rise in the temperature of the thermostatic element 20 eventually resulting in opening of the switch 19. This opens the short circuit for the heater 18 thereby rendering the latter effective to heat the element 11 of the room thermostat above the temperature of the surrounding air, the winding 9 being maintained energized through the holding circuit which includes the heater 18. When the resulting false heating is sufficient to cause opening of the switch 16 which will occur subsequent to the opening of the switch 17, the holding circuit will be opened and the heater 18 and the winding 9 deenergized whereupon the regulating device 8 will move to heat-decreasing position. Thereafter, the room thermostat will cool to the temperature of the air in the space 6 but will be ineffective to initiate another cycle of operation of the heating system until the switch 19 has again closed as a result of a fall in the temperature of the heat transferring mechanism.

If, for any reason, heat is supplied to the room with sufficient rapidity following a call for heat to cause the room thermostat switch 17 to open before opening of the switch 19 in response to a rise in the heating medium temperature, effective energization of the heater 18 will occur immediately. This is because the switch 17 as well as the switch 19 controls the short-circuit for the heater 18. In this way, the length of the heat-increasing period normally determined by the action of the thermostatic switch 19 will be shortened automatically in the event that requirements of the space being heated are satisfied before the end of the normally heat-increasing period as determined by the heater acting in conjunction with the switch 19.

In the modified form shown in Fig. 2, the thermostat switch 19 is operated in the manner previously described, and the room thermostat 10 embodies only one switch 16. When both of these switches are closed, the circuit for energizing the winding 9 is completed extending from the current source 25 through a conductor 26, the switch 16, a conductor 33, the switch 19, a conductor 34, and the winding 9. The terminals of the electric heater 18 are connected between the conductors 33 and 34 so that a circuit through the heater will be completed by closure of the switch 16, but the heater will be maintained ineffectual owing to the short circuit which is maintained around the heater by the then closed switch 19. When the switch 19 becomes open as a result of the rise in the temperature of the thermostatic element 20, the short circuit is broken whereupon the winding 9 is energized through the heater 18 which then becomes effective to produce false heating of the thermostat and operation of the latter to interrupt the supply of heat. Preferably a magnetic detent 35 is associated with the tongue of the room thermostat so that the switch 16 will be operated with a snap action.

I claim as my invention:

1. A control for heating systems having, in combination, a member movable between heat-increasing and heat-decreasing positions to regulate the supply of heat to a space to be heated, a thermostatic element in said space, first and second switches having an electrically common movable contact and closed in succession upon cooling of said element below a predetermined temperature and opened upon reverse movement of the element, an independent thermostatic switch which is opened in response to an increase in the delivery of heat to said space and is closed upon a decrease in the heat delivery following movement of said member to heat-decreasing position, an electric circuit including each of said three switches adapted when closed to cause movement of said member to heat-increasing position, an electrical device adapted when energized to cause movement of said contact in a direction to open said switches, and a switch which is closed while said member is in heat-increasing position and which operates to interpose said device in said circuit in parallel with said thermostatic switch and in series with said first switch.

2. A control for heating systems having, in combination, a regulating device movable between heat-increasing and heat-decreasing positions to control the supply of heat to a space to be heated, a thermostat in said space, an independent thermostatic switch associated with the heating apparatus and adapted to be opened in response to an increase in the supply of heat to said space following movement of said device to heat-increasing position and to be closed in response to a fall in temperature following movement of said device to heat-decreasing position, a circuit adapted when closed and opened to cause movement of said device to heat-increasing and heat-decreasing positions respectively, said circuit being closed when said thermostatic switch is closed and said thermostat is calling for heat, and an electric heater adapted when energized to produce false heating of said thermostat and connected in said circuit in series with said thermostat and in parallel with said thermostatic switch whereby to maintain said circuit closed so long as said thermostat continues to call for heat following opening of said thermostatic switch, said thermostatic switch operating when closed to short-circuit said heater.

3. A control for heating systems having, in combination, means for transferring heat from a primary source of supply to a space to be heated, a regulating device controlling the transfer of heat to said space, a thermostat in said space having a movable member responsive to changes in the space temperature, a circuit adapted to be closed by movement of said member in one direction and when closed to cause movement of said device to heat-increasing position, an electrically energizable element included in said circuit and adapted when energized to cause movement of said member in the opposite direction, an auxiliary thermostatic switch adapted to be opened in response to a rise in the temperature of said transfer means operative on a temperature reversal following the call of said thermostat for heat and to be closed in response to a subsequent fall in temperature, and a short-circuit around said element controlled by said thermostatic switch.

4. A control for heating systems having, in combination, a regulating device movable between heat-increasing and heat-decreasing positions to control the supply of heat to a space to be heated, a thermostat in said space set to respond to variations relative to the temperature to be maintained in said space, a circuit adapted to be closed when said thermostat calls for heat and operating to initiate movement of said device to heat-increasing position, an electric heater associated with said thermostat to produce false heating thereof and interposed in said circuit, and an independent thermostatic switch responsive to temperature changes adjacent a point of delivery of heat to said space under the control of said regulating device adapted to maintain a short-circuit around said heater until heat begins to be delivered to said space at an increased rate following movement of said device to heat-increasing position.

5. A control for heating systems having, in combination, a regulating device controlling the delivery of heat to a space to be heated, an electrically operated mechanism for controlling said device including a winding, a thermostat responsive to deviations in the space temperature from a value desired to be maintained, a circuit controlled by said thermostat and governing the energization of said winding, an electrically energizable element adapted to be interposed in the energizing circuit as an incident to completion thereof and operating on said thermostat when energized to cause movement of said device to heat-decreasing position irrespective of the thermostat temperature, and an independent thermostatic switch associated with the heating apparatus of said system so as to respond to changes in the rate of heat delivery to said space adjacent the point of such delivery and controlling a short-circuit around said element.

6. A temperature control system having, in combination, a thermostat responsive to temperature rises and falls relative to a temperature value to be maintained in a medium to be controlled, an electric heater associated with said thermostat for producing false heating thereof, a circuit through said heater adapted to be closed when the thermostat calls for heat, and an auxiliary thermostat at a point in the system remote from said first mentioned thermostat operating to maintain a short-circuit around said heater for a time interval following the call of said first mentioned thermostat for heat but operable to open the short circuit upon a resulting reversal in the temperature trend at said point.

7. For controlling the operation of heating apparatus by which heat is supplied to a space to be heated, a temperature control system comprising, in combination, a thermostat responsive to deviations of the space temperature having electrically common stiff and flexible contact arms, stationary contacts engaged successively by said flexible and stiff arms on a rise in the space temperature above a predetermined value, an electric heater adapted when energized to produce false heating of said thermostat, an independent thermostatic switch associated with said apparatus so as to be influenced by the temperature thereof and adapted to be closed upon cooling and opened upon heating, a circuit through said switch and each of the switches formed by said contacts and said arms, a switch which is closed as an incident to completion of said circuit, and a circuit controlling said heater extending through said last mentioned switch, the heater, and the switch formed by said flexible arm and its cooperating contact.

HERBERT L. SARGENT.